United States Patent [19]

Winfield

[11] 4,193,729
[45] Mar. 18, 1980

[54] ROLLER ATTACHMENT FOR A VEHICLE

[76] Inventor: Robert J. Winfield, R.R. #2, Davenport, Iowa 52804

[21] Appl. No.: 919,014

[22] Filed: Jun. 26, 1978

[51] Int. Cl.² ............................................. B65F 3/14
[52] U.S. Cl. ................................... 414/532; 414/785
[58] Field of Search ............... 414/462, 507, 534, 532, 414/529, 527, 528, 523, 785; 193/35

[56] References Cited

U.S. PATENT DOCUMENTS

| | | | |
|---|---|---|---|
| 1,150,397 | 8/1915 | Shoemaker . | |
| 2,003,255 | 5/1935 | Duff . | |
| 2,148,245 | 2/1939 | Runkle | 414/532 |
| 2,247,128 | 6/1941 | Levey | 414/532 |
| 2,788,106 | 4/1957 | Clayton | 193/35 R |
| 2,894,548 | 7/1959 | Peck . | |
| 2,931,531 | 4/1960 | Brudi | 414/785 |
| 3,038,616 | 6/1962 | Linder | 414/532 |
| 3,146,599 | 9/1964 | Young | 414/529 |
| 3,210,070 | 10/1965 | Lagana . | |
| 3,239,081 | 3/1966 | Poleschuk | 414/532 |
| 3,393,784 | 7/1968 | Dahanyos | 193/35 R |
| 3,744,610 | 7/1973 | Tabler | 193/35 R |
| 3,900,118 | 8/1975 | Kellogg . | |

Primary Examiner—Lawrence J. Oresky
Attorney, Agent, or Firm—Henderson & Sturm

[57] ABSTRACT

A roller assembly including a plurality of rollers mounted on a base plate. A support assembly having a reinforcement structure is provided. A clamp assembly joins the roller and support assemblies, the support assembly being pivotally attached to the clamp, the clamp being operable to move the roller and support assemblies toward, or away from, each other.

6 Claims, 2 Drawing Figures

ROLLER ATTACHMENT FOR A VEHICLE

SUMMARY OF THE INVENTION

This invention relates to apparatus employed for the loading of vehicles. The loading and unloading of somewhat heavy, elongated structures, such as a boat or a large crate or the like, has never been a particularly easy task. Damage both to the bed of the vehicle, particularly near the rear, loading end thereof, and to the structure being loaded or unloaded, has been a frequent occurrence.

This invention of a roller attachment for a vehicle includes a roller assembly having a plurality of rollers carried by a base plate. A clamp assembly is attached to the base plate. A support assembly is pivotally attached to the clamp and includes a reinforcement structure. The clamp is operable to move the roller and support assemblies toward, or away from, each other, thereby enabling the roller attachment to be detachably affixed to the bed of a vehicle. The structure being loaded or unloaded passes over the roller assembly.

It is an object of this invention to provide an attachment for a vehicle which facilitates the loading, and unloading, of a structure onto, and from, the bed or the like of a vehicle while minimizing damage to the structure or the vehicle bed.

Another object of this invention is to provide an attachment for a vehicle which is readily adjustable to vehicle beds of various dimensions.

Also an object of this invention is the provision of an attachment for a vehicle of a suitably reinforced configuration.

Another object of this invention is to provide an attachment for a vehicle which is simple of construction and economical of manufacture yet capable of attaining the aforementioned objects.

These objects and other features and advantages of this invention of a roller attachment for a vehicle will become readily apparent upon referring to the following description taken in conjunction with the appended drawing.

BRIEF DESCRIPTION OF THE DRAWING

This invention of a roller attachment for a vehicle is illustrated in the drawing wherein.

DETAILED DESCRIPTION

Figure 2:
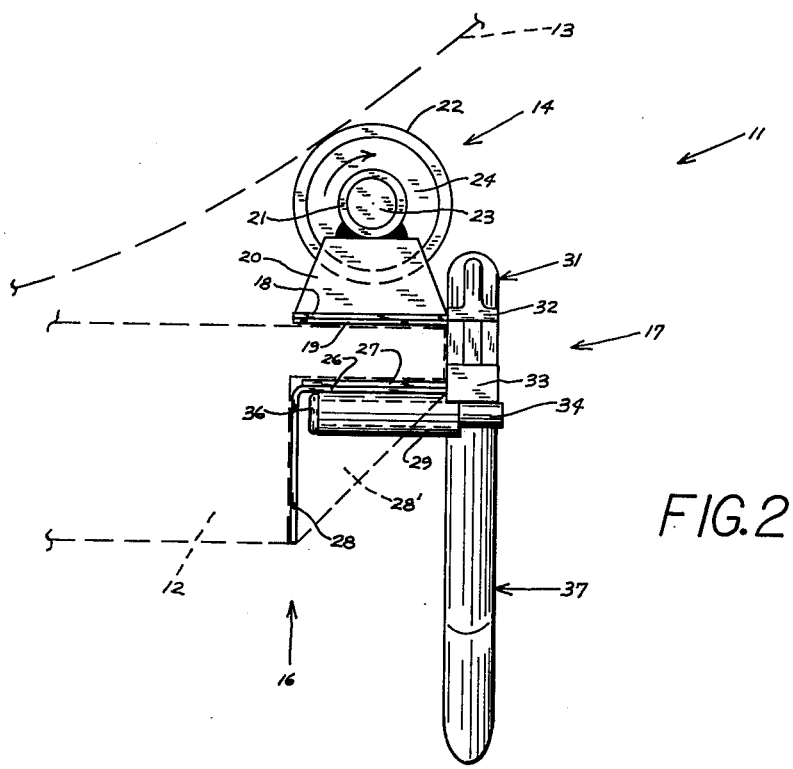
FIG. 2 is a side elevational view taken from the direction of line 2—2 in FIG. 1.

The invention of a roller attachment for a vehicle is shown generally at 11, in FIG. 2, fixed to the bed 12 or the like of a vehicle. A boat structure 13 is illustrated disposed on the bed 12 and in engagement with the attachment 11. More particularly, the roller attachment 11 includes a roller assembly 14, a support assembly 16 and a clamp assembly 17.

The roller assembly 14 includes a base plate 18 which is elongated and substantially flat and rectangular. Joined, as by an adhesive, to the underside of plate 18 is a pad 19. The pad 19 is also generally elongated and substantially flat and rectangular. A pair of upright support members 20 are attached, as by welding, to the upper side of base plate 18, each member 20 being disposed adjacent one end of the plate 18. The upright supports 20 are disposed transversely of the plate 18 and, when viewed in elevation (as in FIG. 2), display a trapezoidal configuraton. A sleeve or journal bearing 21 is attached, as by welding, to the upwardly extended edge of each upright support 20. Each journal bearing 21 is elongated and cylindrical. The longitudinal axes of the bearings 21 are aligned and are parallel with the longitudinal axis of the base plate 18, all of the axes defining a plane normal to the plate 18. A plurality of cylindrical rollers 22 are attached, being pressed on to an elongated, cylindrical journal 23. Washer members 24 are slipped over each end of the journal 23 and moved to abutment with opposite sides of the plurality of rollers 22. Opposite ends of the journal 23 are rotatably received by the journal bearings 21, the washers 24 being disposed in abuttment with the facing ends of the bearings 21.

The support assembly 16 includes an elongated, substantially flat and rectangular plate portion 26. Joined, as by an adhesive, to the upper side of plate 26 is a pad 27. A reinforcement member 28 depends from the forward, longitudinal edge of the plate 26. The reinforcement 28 is also elongated, substantially flat and rectangular and is disposed normal to the plate 26. A cylindrical sleeve structure 29 is attached, as by welding, to the underside of the plate 26. The sleeve 29 is disposed transversely of, and intermediate the ends of, plate 26.

Figure 1:
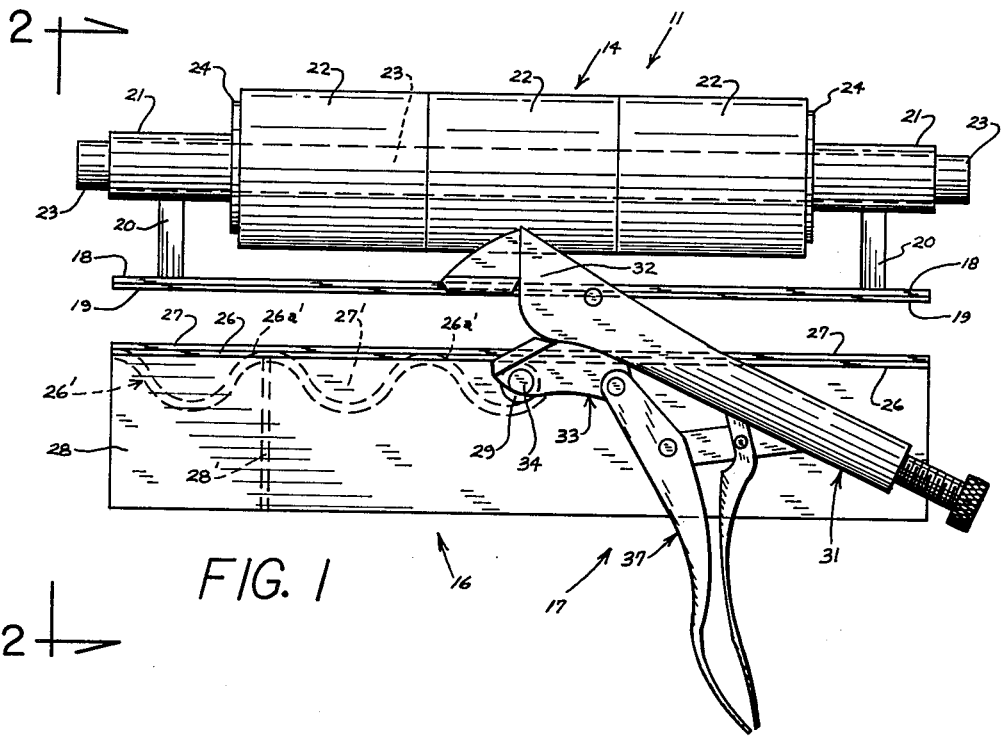
FIG. 1 is a front elevational view of the roller attachment.

The support assembly 16 may have a modified configuration in that plate 26 may be replaced by a corrugated plate portion 26' (shown in dotted lines in FIG. 1). The corrugations 26a' extend transversely of the plate 26'. The pad 27 may be modified to include transverse depending portions extending into areas 27' disposed between corrugations 26a', the pad 27 retaining a flat, upwardly disposed surface. The sleeve 29 is then attached in one of the channels between corrugations 26a'. The reinforcement member 28 may also be modified to include one or more reinforcement structures such as the plate 28' (dotted lines FIGS. 1 and 2) attached, as by welding, between plate 26 and reinforcement 28.

The clamp assembly 17 includes an elongated first member 31 attached, as by welding, at one end 32 to the rear longitudinal edge of base plate 18. The member 31 is attached intermediate the ends of plate 18. A second member 33 has a journal or bolt member 34 attached normal thereto, as by welding. The member 34 is rotatably received by sleeve 29 and secured therein by an enlarged end 36. The second member 33 is also pivotally attached to the first member 31, and a vise-grip mechanism 37 of standard construction is borne by, and interconnects, the members 31, 33.

The components of the roller attachment 11 are generally of iron and steel, selected for strength adequate for the load to be borne during the ultimate intended use of the attachment 11. Selection of the correct strength iron and steel may be done readily by one skilled in the art. Aluminum is also an adequate material for attachments 11 designed to bear somewhat lighter loads. The rollers 22 and pads 19, 27 are composed of suitable plastics or rubber, the selection of which, again, may be done readily by one skilled in the art.

The roller attachment 11 is used by attaching it to the bed 12 of a vehicle (FIG. 2). Pivoting of the members 31, 33 with respect to each other permits the roller and support assemblies 14, 16 to be separated such that the attachment 11 may fit over the end of the bed 12. The attachment 11 is then properly positioned, usually intermediate the ends of the rear edge of the bed 12, where one attachment 11 is employed, or uniformly spaced between the ends of the rear edge of the bed 12, where more than one attachment is employed, although the positions may vary according to the particular task. The members 31, 33 of the clamp assembly 17 are then pivoted such that the roller and support assemblies 14, 16 are moved toward each other and thereby into engagement with the bed 12, the pads 19, 27 being disposed against the upper and lower surfaces, respectively, of the bed 12. The vise grip mechanism 37 is then operated to lock the attachment 11 to the bed 12.

The boat 13, or other structure to be loaded or unloaded, is tipped onto the rollers 22. The boat 13 then may be moved over the edge of the bed 12, being borne by the roller assembly 14, the rollers 22 and journal 23 rotating in the bearings 21. The direction of rotation for unloading is indicated in FIG. 2. After the boat 13 or the like has been loaded or unloaded, the roller attachment(s) 11 may be removed from the bed 12. The vise grip mechanism 37 is unlocked, and the roller and support assemblies 14, 16 are moved apart by pivoting of the members 31, 33. The bed 12 of the vehicle may then be closed in the normal manner, as by lifting up the tailgate in a pickup truck, closing the rear doors of an enclosed trailer, or the like.

The clamp assembly 17 is adjustable to different degrees of tightness. The support assembly 16 may pivot to an orientation other than parallel with roller assembly 14, the bolt 34 rotating within sleeve structure 29. The pads 19, 27, 27' facilitate securement to the bed 12. As illustrated in FIG. 2, the reinforcement 28 may act as a guide and as a further securement by a nesting fit with certain beds 12. The attachment 11 is thereby adapted to a variety of vehicle beds 12. The reinforcement conformations 26', 28, 28' also facilitate adaptation of the attachment 11 to a variety of vehicle beds 12 and to the handling of a variety of structures 13. Although a preferred embodiment and modifications thereof have been disclosed herein, it is to be remembered that alternate constructions can be made thereto without departing from the full scope of the invention, as defined in the appended claims

I claim:

1. A roller attachment for a vehicle bed, said attachment comprising:
    roller means for loading and unloading the bed;
    support means having a reinforcement member; and
    clamp means for selectively altering and locking the disposition of said roller means and said support means, said roller means being attached to said clamp means, said support means being pivotally attached to said clamp means, said clamp means being operable to increase the distance between said roller means and said support means thereby to effect disengagement from the bed, said clamp means being operable to decrease the distance between said roller means and said support means, the bed being disposed between said roller means and said support means, to effect engagement with, and locking onto, the bed.

2. A roller attachment as defined in claim 1 and further wherein said support means includes a base member selectively engageable with the underside of the bed, said reinforcement member depending from said base member.

3. A roller attachment as defined in claim 2 and further wherein said base member includes a plurality of corrugations.

4. A roller attachment as defined in claim 2 and further wherein said support means includes at least one reinforcement plate extending between said base member and said reinforcement member.

5. A roller attachment as defined in claim 2,3 or 4 and further wherein said base member includes a pad means attached thereto and disposed against the bed when said base member engages the bed.

6. A roller attachment as defined in claim 2 or 3 and further wherein said roller means includes a plate member, a plurality of roller members rotatably supported by said plate member, and a pad structure attached to said plate member opposite said roller members, said pad structure being disposed against the bed when said roller means engages the bed.

* * * * *